United States Patent [19]

Baba et al.

[11] Patent Number: 4,804,831
[45] Date of Patent: Feb. 14, 1989

[54] FOCUS DETECTING APPARATUS INDEPENDENT OF OBJECT IMAGE CONTRAST

[75] Inventors: Takashi Baba; Yukichi Niwa, both of Atsugi; Minoru Yoshii, Tokyo; Takako Watanabe, Atsugi, all of Japan

[73] Assignee: Canon Kabushiki Kaisha, Tokyo, Japan

[21] Appl. No.: 922,740

[22] Filed: Oct. 24, 1986

[30] Foreign Application Priority Data

Oct. 30, 1985 [JP] Japan ................................ 60-245239
Jul. 9, 1986 [JP] Japan ................................ 61-161053

[51] Int. Cl.$^4$ .............................................. G02B 7/00
[52] U.S. Cl. .................................. 250/201; 354/402; 358/227
[58] Field of Search ................ 250/201, 204; 354/400, 354/402, 404–408; 358/227

[56] References Cited

U.S. PATENT DOCUMENTS

| | | | |
|---|---|---|---|
| 4,379,632 | 4/1983 | Dedden et al. | 355/68 |
| 4,542,289 | 9/1985 | Yokoyama et al. | 354/402 |
| 4,568,168 | 2/1986 | Sakai et al. | 354/402 |
| 4,600,832 | 7/1986 | Grund | 354/402 |
| 4,616,264 | 10/1986 | Pshtissky | 354/402 |

Primary Examiner—Edward P. Westin
Assistant Examiner—Charles F. Wieland
Attorney, Agent, or Firm—Robin, Blecker & Daley

[57] ABSTRACT

In an automatic focusing apparatus, a focus detecting device having detecting means for detecting the width of the edge part of the image of an object to be photographed and discriminating means for discriminating a focused state on the basis of the size of the detected width is arranged to determine by the discriminating means the apparatus to be out of focus when the width of the edge part of the object image is wide and to be in focus when the width of the edge part is narrow, so that the focus detecting device can operate without being affected by difference in the kind and the contrast of the object to be photographed.

56 Claims, 10 Drawing Sheets

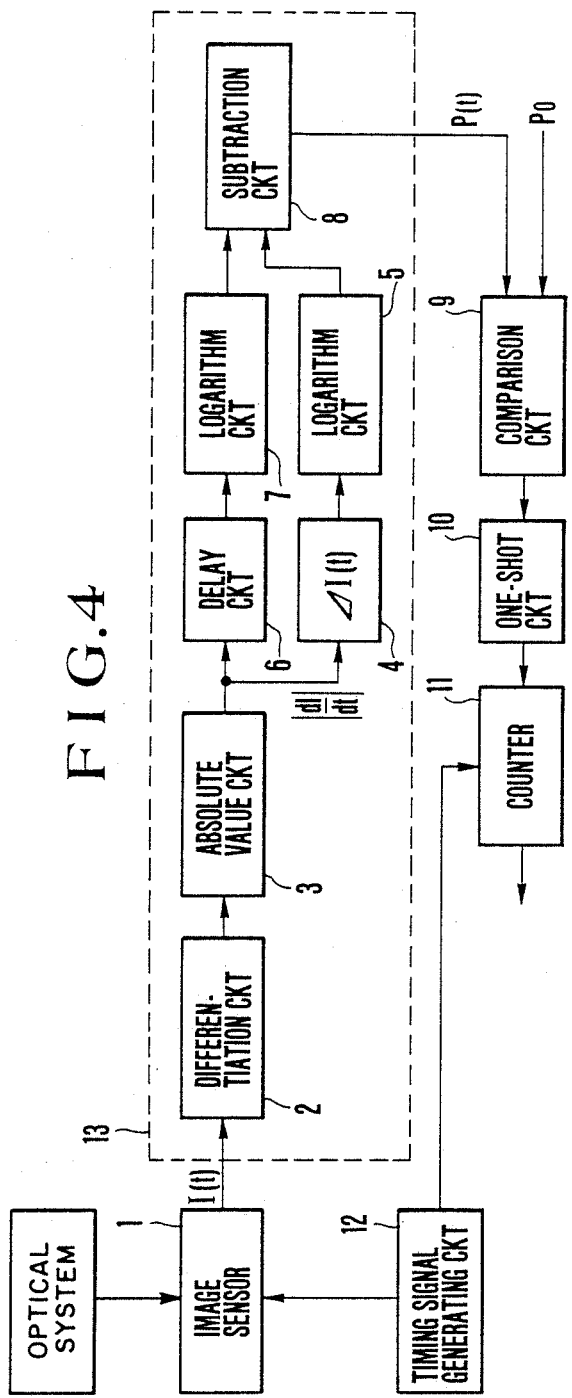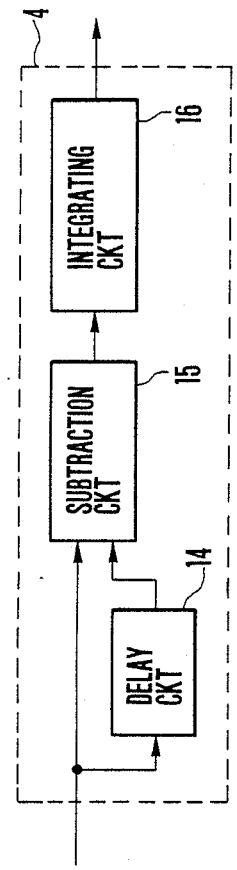

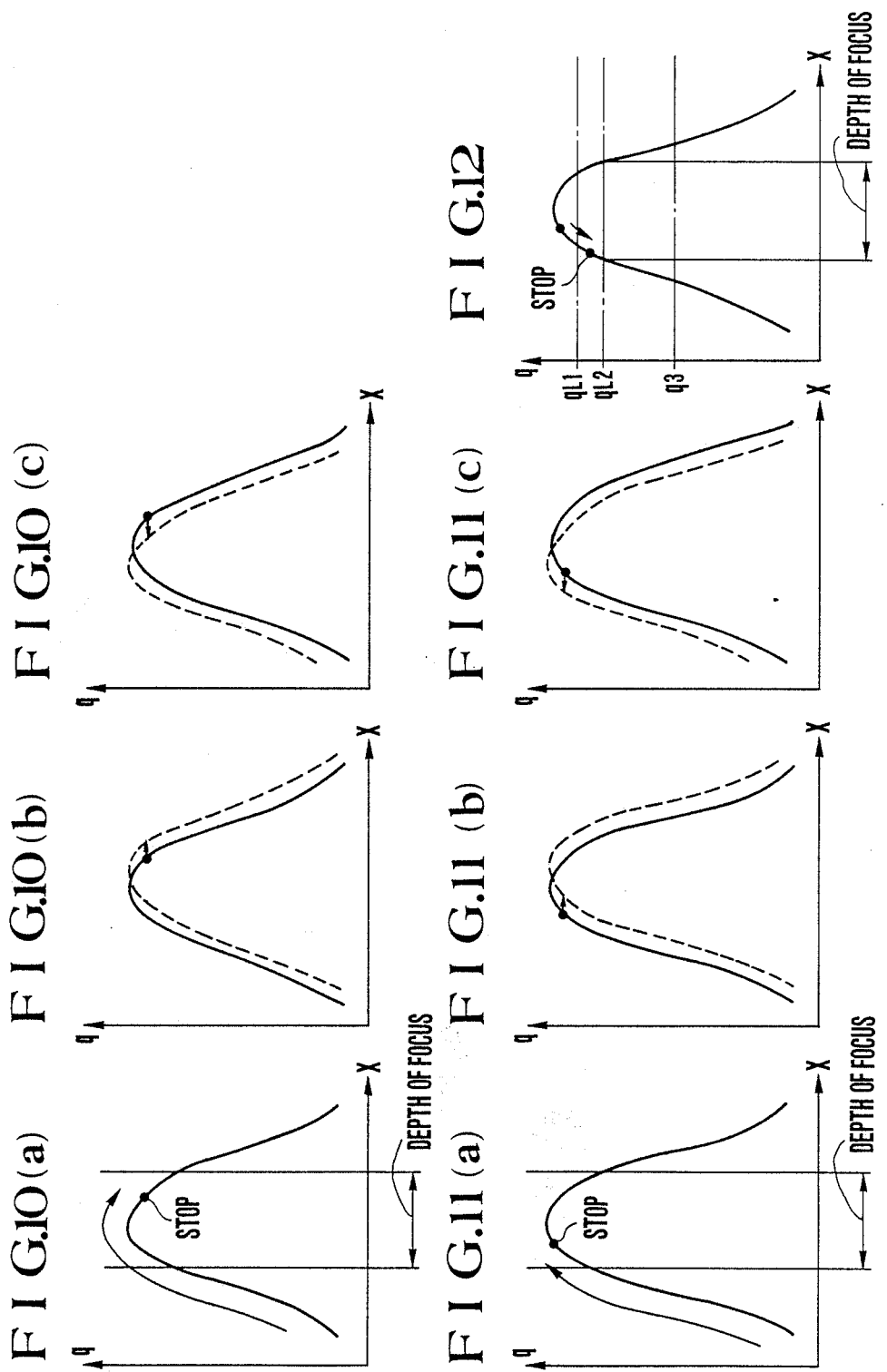

FOCUS DETECTING APPARATUS INDEPENDENT OF OBJECT IMAGE CONTRAST

BACKGROUND OF THE INVENTION:

1. Field of the Invention

This invention relates to a focus detecting apparatus.

2. Description of the Related Art

Sharpness detecting methods of varied kinds have been known for detecting the sharpness of the image of a photographing object formed on an image plane through a picture signal obtained from the image sensor of a video camera or the like in carrying out a focusing operation by driving an optical system in such a way as to maximize the sharpness thus detected.

In the first type of these known methods, a high frequency component of the picture signal is extracted by means of a by-pass filter and a differentiation circuit or the like; and the sharpness of the object image is evaluated by the intensity of the extracted high frequency component. In carrying out the focusing operation in accordance with this method, the direction in which the optical system is to be driven is determined by comparing the degrees of sharpness of two differently formed images obtained during the process of driving the optical system. An and an infocus state of the optical system is obtained by bringing the optical system to a stop at a point where the image sharpness is obtained in a maximum degree.

In one example of the second type of the known methods which is disclosed in Japanese Patent Publication No. SHO 54-44414, the fact that the size of the medium density range of the object to be photographed varies with the degree of focus is utilized. In other words, the medium density area becomes large in the event of defocus and small in the case of an in-focus state. The disclosed focus detecting device is thus arranged to determine an in-focus state at a point where the medium density area reaches a minimum size. Aother example of the second known method is disclosed in Japanese Patent Publication No. SHO 52-30324. In this case, unlike the device of Japanese Patent Publication No. SHO 54-44414 which is arranged to detect the size of the medium density range, the size of either the high density range or low density range of an object is detected; and, by utilizing the fact that the size of the high or low density range varies with the focusing degree, an in-focus state is judged to be attained at a point where such a density range reaches a maximum size.

Generally, however, the degree of detected image sharpness greatly varies according to the kind and contrast of the object to be photographed. Therefore, the above-stated first and second prior art methods present the following problem. Since the detected sharpness changes, for example, due to a slight movement of the object or due to a change in the illuminating conditions, an erroneous maximum value of sharpness might be obtained during a driving operation on the optical system. In that event, the optical system tends to come to a stop at a point which is not a real in-focus position. Besides, once the optical system comes to a stop in this manner, a differently formed image is no longer obtainable for further comparison. Then, the device becomes incapable of correctly detecting the actual focused state of the optical system. Further, in accordance with the conventional known methods in general, not only the above-stated first and second methods, the position of the optical system must be at least once shifted past an in-focus point. Therefore a picture thus obtained comes to blur after it has reached an in-focus state and before it comes to recover the in-focus state. As a result, the picture becomes disagreeable.

SUMMARY OF THE INVENTION

It is a principal object of this invention to solve the above-stated problems presented by the prior art methods.

It is another object of this invention to provide a focus detecting apparatus which is capable of accurately detecting a focused state irrespective of difference in the kind and contrast of the object to be photographed.

It is a further object of this invention to provide a focus detecting apparatus which is capable of permitting a prompt focusing operation when applied to an automatic focusing arrangement.

Under these objects, a focus detecting device of the kind having a photo-electric converting element for converting an image of an object formed on a photoelectric converting plane into an electrical signal is arranged as a first embodiment of this invention to determine an in-focus state by detecting the width of an edge part of the object image with detecting means and on the basis of the size of the width detected by the detecting means.

It is a feature of this device that when the maximum degree of sharpness of an object image obtained at a point comes to vary as the actual stopping position of an photo-taking optical system differs from this point, the photo-taking optical system is driven in the direction of obtaining the maximum degree of sharpness if the sharpness is thus decreased and in the opposite direction if the sharpness is increased, so that the driving direction can be promptly and accurately determined for focusing.

It is a further object of this invention to provide an automatic focusing apparatus which is capable of promptly focusing.

It is a further object of this invention to provide an automatic focusing apparatus which is arranged to prevent a disagreeable phenomenon such as hunting.

It is a further object of this invention to provide an automatic focusing apparatus which is capable of stably operating in despite of differences in the kind and contrast of objects to be photographed.

To attain these objects, an automatic focusing apparatus arranged according to this invention as a second embodiment comprises sharpness detecting means for detecting the degree of sharpness of an object image formed on an image pick-up plane by a photo-taking or image pick-up optical system; means for driving the optical system in the direction of increasing the degree of sharpness and for bringing the optical system to a stop by shifting the position of the optical system within an in-focus range from a maximum sharpness obtainable position in a given direction; and means for determining the direction in which the optical system is to be driven according to information on a degree of sharpness detected by the detecting means after the optical system is brought to a stop and as well as according to the above-stated given direction.

Further objects and features of this invention will become apparent from the following detailed description of preferred embodiments thereof taken in connection with the accompanying drawings.

BRIEF DESCRIPTION OF THE DRAWINGS

FIGS. 1(b), 2(b) and 3(b) show the wave forms of image or picture signals obtained from these objects under in-focus conditions respectively.

FIGS. 1(c), 2(c) and 3(c) show the wave forms of the image signals obtained under out-of-focus conditions.

FIGS. 4 and 5 are block diagrams showing an embodiment of this invention.

FIGS. 10(a) to 10(c) and 11(a) to 11(c) show another version of this invention.

FIG. 12 is a graph showing sharpness q in relation to threshold values qL1 and qL2.

Figure 1A:
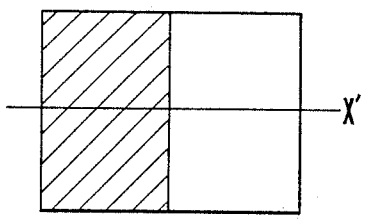
FIGS. 1(a) to 1(c), 2(a) to 2(c) and 3(a) to 3(c) show the principle of this invention. Of these drawings, FIGS. 1(a), 2(a) and 3(a) respectively show the conditions of different objects to be photographed.
Figure 1B:
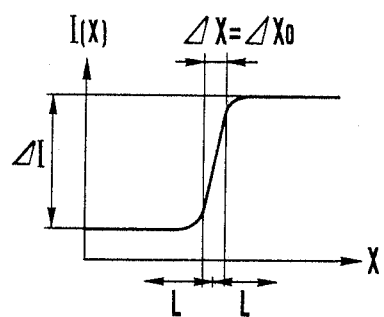
Figure 1C:
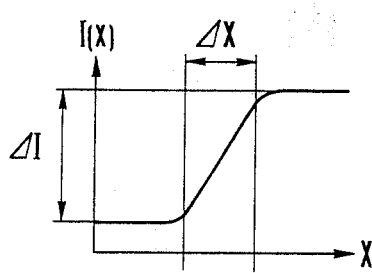

DETAILED DESCRIPTION OF THE PREFERRED EMBODIMENTS:

First, the principle of this invention is described with reference to FIGS. 1(a) to 1(c) and 2(a) to 2(c) as follows: FIG. 1(a) shows a graphic form of an edge which is an object to be photographed and consists of a black-and-white pattern. In FIG. 1(a), a spatial axis x' is shown as perpendicularly crossing the optical axis of an optical system. An image sensor of the photo-electrical type converts such a graphic form of the edge into an electrical image signal. As shown in FIG. 1(b), the level I(x) of the image signal thus obtained has an acute edge when an optical system is in an in-focus state. In the event of an out-of-focus state of the optical system, however, the signal has a dull edge as shown in FIG. 1(C). Further, a reference symbol x denotes an axis on the image pick-up plane of the image sensor corresponding to the spatial axis x' shown in FIG. 1(a). Generally, the image signal is taken out in the form of a time series signal by electrically scanning the iamge sensor. However, for the purpose of illustration, this signal is regarded herein as a signal relative to the axis x on the image pick-up plane.

Referring to FIGS. 1(b) and 1(c), a width $\Delta x$ between the image signal I(x) and the edge part become a minimum value $\Delta xo$ under an in-focus condition and increases according as the an out-of-focus degree increases. The width $\Delta x$ is determined by the diameter of the circle of confusion, the resolution of the image sensor and the band width of a picture signal processing circuit. However, By the term "circle of confusion" is meant the indistinct circular patch formed by a lens representing the out-of-focus image of a single object point. since the latter two factors are irrelevant to the focused state of an optical system, the optical system can be determined to be in focus or out of focus by detecting the width $\Delta x$ of the edge part of the image or picture signal. The optical system is considered in focus in the case of $\Delta x \simeq \Delta xo$ and to be out of focus in the event of $\Delta x > \Delta xo$. The discrimination between an in-focus state and an out-of-focus state is made irrespective of the average brightness or luminance of the edge figure and the contrast thereof. In other words, the width of the edge part of the iamge of an object to be photographed is detected and the image is determined to be not in focus when the width is large and to be in focus when the width is small.

Figure 2A:
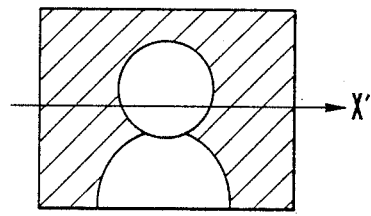
Figure 2B:
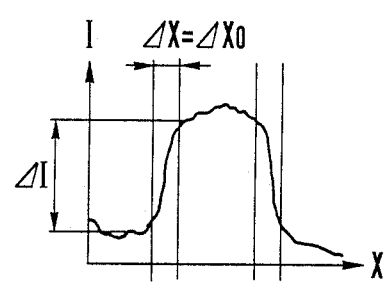
Figure 2C:
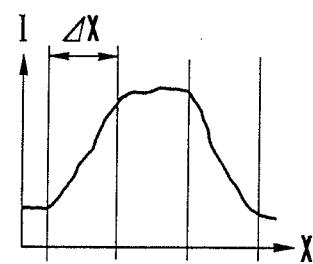
Figure 3A:
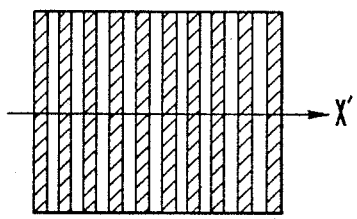
Figure 3B:
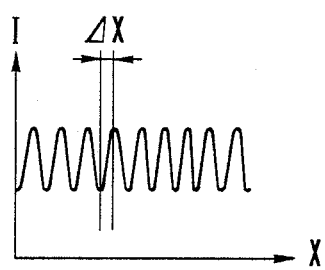
Figure 3C:
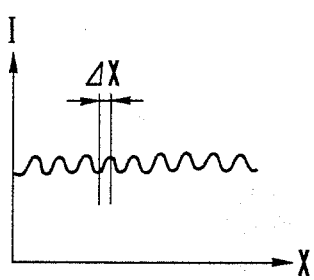

Further, in the case of an ordinary object shown in FIG. 2(a), the brightness at the contour part of persons or other objects discontinuously varies. In the neighborhood of the contour part, there is some brightness (or luminance) distribution which closely resembles the graphic form of edge shown in FIG. 1(a). Therefore, as shown in FIGS. 2(b) and 2(c), the width of the edge part $\Delta x$ of the image signal I(x) is obtained. Then, a discrimination between an in-focus state and an out-of-focus state can be made by comparing the width thus obtained with a known value $\Delta xo$ which represents the width of the edge part obtainable when the optical system is in focus. In the event of an object having a fine pattern as shown in FIG. 3(a), no focused state is detectable as contributions from two edge parts overlap each other and thus the width $\Delta x$ does not increase even in the event of an out-of-focus state. In detecting focus, therefore, as shown in FIG. 1(b), the width L of each of the black and white portions forming the edge part must be somewhat larger than the value $\Delta xo$ for focus dection. For example, the former must be at least two times to several times larger than the latter. Since the valve $\Delta xo$ is about equal to the minimum diameter of the circle of confusion of the optical system, the width L is very small compared with the size of the whole image plane. An edge part like this exists in almost every object to be photographed. Therefore, with focus detection arranged to be performed in this matter, it adequately applicable to almost every photographing object.

In the case of this embodiment, the width $\Delta x$ of the edge part is obtained by computing the brightness gradient dI/dx of the edge part from the image signal I(x) and a brightness or luminance difference $\Delta I$ between the edge parts shown in FIGS. 1(b) and 2(b) and then by computing a ratio P between them as follows: $P=(dI/dx)/\Delta I$. In other words, the width $\Delta x$ of the edge part is indirectly obtained. The value P corresponds to the reciprocal number of the width $\Delta x$ of the edge part and indicates the acuteness of the edge part. The luminance difference $\Delta I$ between the edge parts obtained under an in-focus condition remains unchanged under a somewhat out-of-focus condition of the optical system as shown in FIGS. 1(b) and 1(c). Therefore, this value $\Delta I$ is detectable under the out-of-focus condition even when the wave form of the in-focus image signal is unknown beforehand. The width $\Delta x$ of the edge part thus can be obtained by normalizig on the basis of this value $\Delta I$ the edge part gradient dI/dx which sensitively varies according to an in-focus state or an out-of-focus state. Further, the width $\Delta x$ of the object is not dependent on the average brightness and the contrast of the object. Therefore, a discrimination can be made between an in-focus state and an out-of-focus state of the optical system without being affected by any difference in the average brightness or contrast of the object.

An embodiment which operates on the principle described above is arranged as follows: FIG. 4 shows in a block diagram the embodiment as a first embodiment of this invention. In obtaining the above-stated ratio value $P=(dI/dx)/\Delta I$, the value of each point x which is expressed pressed as P(x) is obtained as follows: $P(x)=(dI/dx)/\Delta I(x)$. The value P(x) thus obtained is compared with a given threshold value $Po \simeq 1/\Delta xo$ for obtaining the number of in-focus edges. Then, if the number of the in-focus edges exceeds a given number, the optical system is regarded as in focus. Further, the value ΔI(x) is computed as folows:

$$\Delta I(x) = \int_{x-L}^{x+L} dx' \left| \frac{dI}{dx}(x') \right|$$

In the formula given above, "L" represents a value which is two to several times as large as the diameter of the minimum confusion circle of the optical system. Therefore, an integrating operation for this value is accomplished within a range of the picture elements of the image sensor indicating several to 10 picture elements or thereabout. The value ΔI(x) gives a value of difference ΔI between the highest luminance and lowest luminance of an area within a given range located before and after the edge part such as those shown in FIGS. 1(b) and 1(c) in the case of such an edge part. In the event of a fine pattern such as the one shown in FIG. 3(a), the value ΔI(x) always exceeds the difference between the highest and lowest values and thus results in a small value P(x), which never misleads a focus discriminating operation.

Referring to FIG. 4, the illustration includes an image sensor 1 which is arranged to time serially produce a video signal; a differentiation circuit 2 which is arranged to perform a differentiating operation for obtaining the gradient dI/dt of the image or video signal or to produce a difference signal indicative of a difference between a signal which is delayed a given length of time and a signal which is not delayed; an absolute value circuit 3; and a computing circuit 4 which is arranged to obtain a signal ΔI(t) corresponding to the above-stated value ΔI(x). A reference symbol t denotes a length of time elapsed after commencement of reading out the signal from the image sensor 1. The details of arrangement of the ΔI(t) computing circuit 4 are as shown in FIG. 5. The circuit 4 includes a delay circuit 14 which is arranged to delay an incoming signal as much as a period of time T; a subtraction circuit 15; and an integrating circuit 16. These two circuits jointly serve to integrate a delay difference signal $$\left| \frac{dI}{dt}(t) \right| - \left| \frac{dI}{dt}(t-T) \right|$$

relative to the incoming signal $$\left| \frac{dI}{dt}(t) \right|.$$

This integrating operation gives a signal $$\Delta I(t) = \int_{t-T}^{t} dt' \left| \frac{dI}{dt}(t') \right|.$$

In FIG. 4, reference numeral 6 denotes a delay circuit which is arranged to delay for about a period of time T/2 the signal $$\left| \frac{dI}{dt}(t) \right|;$$

numerals 5 and 7 denote logarithm circuits; and a numeral 8 denotes a subtraction circuit. With a logarithmic difference obtained, a signal $$P(t) = \left| \frac{dI}{dt}\left(t - \frac{T}{2}\right) \right| / \Delta I(t)$$

is obtained. The signal P(t) thus obtained is compared with the above-stated preset threshold value Po at a comparison circuit 9. A one-shot circuit 10 is arranged to produce a pulse signal on the basis of the output of the comparison circuit 9. The number of pulses of the pulse signal is counted by a counter 11. A timing signal generating circuit 12 is arranged to generate timing signals for the whole system as well as driving clock pulses to be applied to the image sensor 1. The counter 11 is arranged to be reset by a vertical synchronizing signal and to count the number of edge parts of acuteness exceeding the threshold value Po which is within one field or one frame. The optical system is determined to be in focus when the count value thus obtained exceeds a given value or to be out of focus when it does not exceed the given value. The threshold value Po does not have to be set at a fixed value. In case that the image forming performance of the optical system varies to a large extent with an aperture value or a zooming state thereof, it is preferable to provide some means for detecting these parameters and for setting the value Po at an optimum value accordingly. For example, in the event that the performance of the optical system degrades to have a larger diameter of circle of confusion according as the aperture value increases, the threshold value Po is arranged to become smaller according as the aperture value increases. Further, in the case of signals of the NTSC system, the time constant of the differentiation or differential circuit 2 is preferably set at a value between 100 and 500 n sec. and the delay time T of the delay circuit at a value between 500 n sec. and 2 μ sec. respectively. The manner in which the value ΔI(t) is obtained may be changed to $$\Delta I(t) = \left[ \int_{t-T}^{t} dt' \left| \frac{dI}{dt}(t') \right|^2 \right]^{\frac{1}{2}}$$

In this instance, where $$\left| \frac{dI}{dt}(t) \right|$$

becomes a small value, this part contributes little to the value ΔI(t). Therefore, the luminance difference ΔI also can be obtained by computation for an edge part having some degree of ripple as shown in FIG. 2(b) in the same manner as for an ideal edge part as shown in FIG. 1(b). In this instance, the absolute value circuit 3 is replaced with a squaring circuit. In another possible modification, a limiter is provided in between the absolute value circuit 3 and the ΔI(t) computing circuit 4 and, when the value $$\left|\frac{dI}{dt}\right|$$

is lower than a given value, the input signal of the circuit 4 is forcedly made to be zero for obtaining the same advantageous effect.

Further, when the value ΔI(t) computed by the computing circuit 4 is small, some error is included in the value $$\left|\frac{dI}{dt}\right|$$

supplied to the logarithm circuit 7 due to some noise of the image signal. In that event, the accuracy of the detected value P(t) degrades. This error can be removed by changing the characteristic of the logarithm circuit 7 in such a manner that the output signal thereof shifts in the direction or making it larger than a value logΔI(t) according as the input signal ΔI(t) becomes smaller and thus to make the detected value P(t) smaller.

Figure 6:
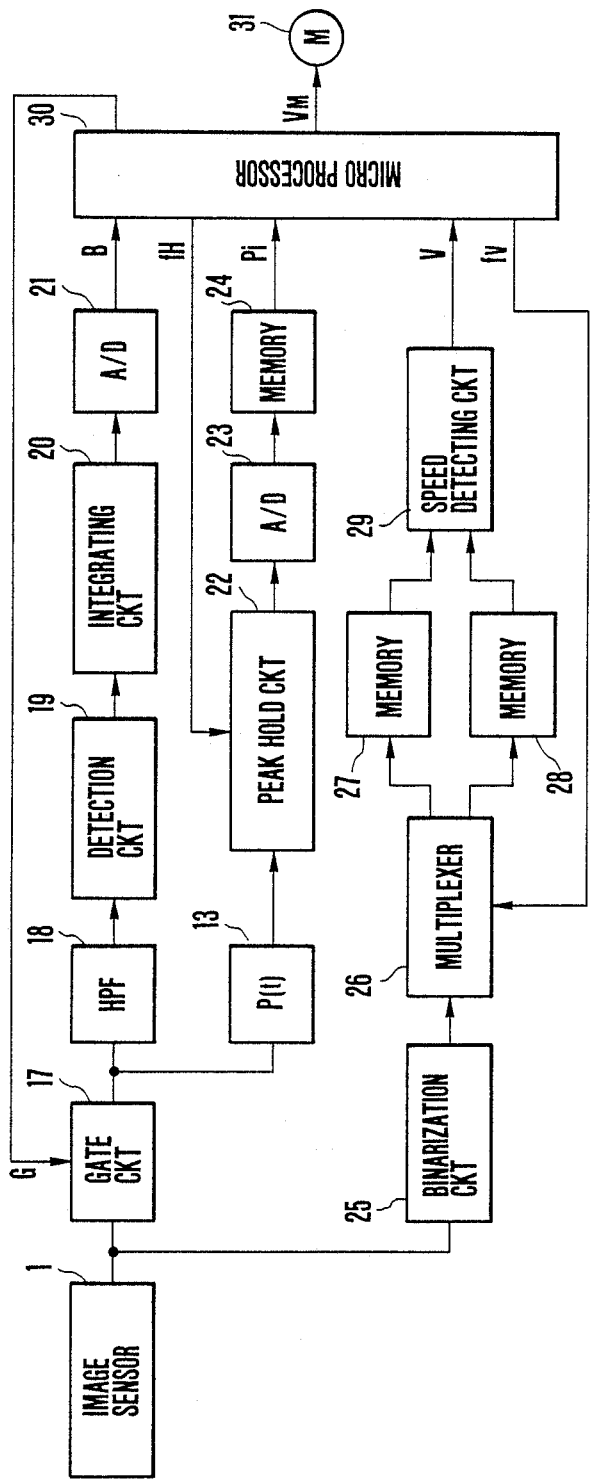
FIG. 6 is a block diagram showing an automatic focusing apparatus including a focus detecting device arranged as an embodiment of this invention.

FIG. 6 is a block diagram showing a second embodiment, wherein this invention is applied to an automatic focusing apparatus. The illustration omits memory address counters and control lines for memories and A/D converters for the sake of simplification. Referring to FIG. 6, an image signal obtained from the image sensor 1 is supplied to a gate circuit 17. The gate circuit 17 allows to pass only a part of the signal corresponding to a given detecting area of the image plane in accordance with a control signal G. The illustration includes a high-pass filter 18; a detection circuit 19; an integrating circuit 20 which is arranged to detect the intensity of the high frequency component of the image signal obtained from the detecting area within one frame or one field portion of the signal; and an A/D converter 21 which is arranged to A/D convert the detected intensity of the high frequency component.

The output of the A/D converter 21 is supplied as a signal B to a micro processor 30. A computing circuit 13 which is arranged as shown in FIG. 4 to compute the acuteness value P(t) of the edge part A peak hold circuit 22 is arranged to hold a maximum value Pi of the value P(t) obtained within one horizontal scanning line and to be reset by a signal fH, the level of which changes between low and high levels for every horizontal scanning process. An A/D converter 23 is arranged to A/D convert the maximum value Pi of the value P(t) obtained by every horizontal scanning and to have the converted maximum values Pi stored one by one at a memory 24. In the reference symbol Pi assigned to the maximum value, "i" represents a scanning line number within the detecting area. The micro processor 30 reads out the contents of the memory 24 within the vertical retrace period of one frame or one field. Circuit elements 25 to 29 are provided for the purpose of computing the moving speed of the image of an object to be photographed. In the case of a video camera in particular, the automatic focusing device is prevented by virtue of these elements 25 to 29 from erroneously or unstably operating due to shaking of camera introduced from vibration of hand or due to movement of the object to be photographed. More specifically, when an in-focus image of the object is temporarily moved or displaced out of the detecting area of the image plane by hand vibration or moving of the object, the optical system would be misjudged to be not in focus and, as a result, a motor 31 would be driven. Further, even of the object image then still remains within the detecting area, the vibration of the camera dulls the acuteness P(t) of the edge to be detected by the accumulating action of the image sensor 1 and then an in-focus state would be mistaken for an out-of-focus state. The circuit elements 25 to 29 are arranged to solve this problem by detecting the moving speed of the object image. This arrangement includes a binarization circuit 25 which extracts the pattern of an image by binarizing an image signal; a multiplexer 26; and memories 27 and 28 which are arranged to alternately store the extracted pattern of the image with the multiplexer arranged to operate according to a signal fv the level of which is arranged to change between high and low levels for every one frame or one field. The memories 27 and 28 are thus arranged to store image patterns for two continuous frames or fields. This arrangement then enables a speed detecting circuit 29 to compute a correlation between the stored image patterns. By this, the vector V of image movement, which takes place during one frame or field period, is obtained. Information on this movement vector V is supplied from the circuit 29 to the micro processor 30.

Motor 31 is arranged to shift the position of a focusing lens within the optical system. The speed and direction of the operation of the motor are under the control of a signal VM produced from the micro processor 30. The flow of operation to be controlled by the micro processor 30 is as described below with reference to FIGS. 7, 8 and 9.

Figure 7:
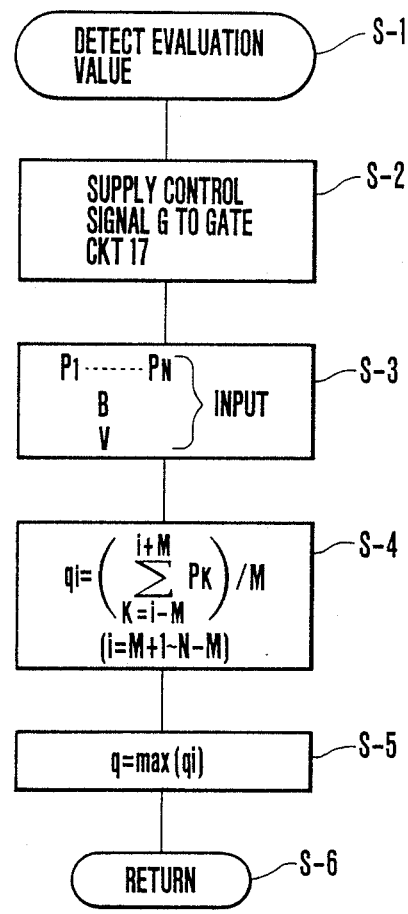
FIGS. 7 to 9 are flow charts showing the operation of a micro processor 30 shown in FIG. 6.
Figure 8:
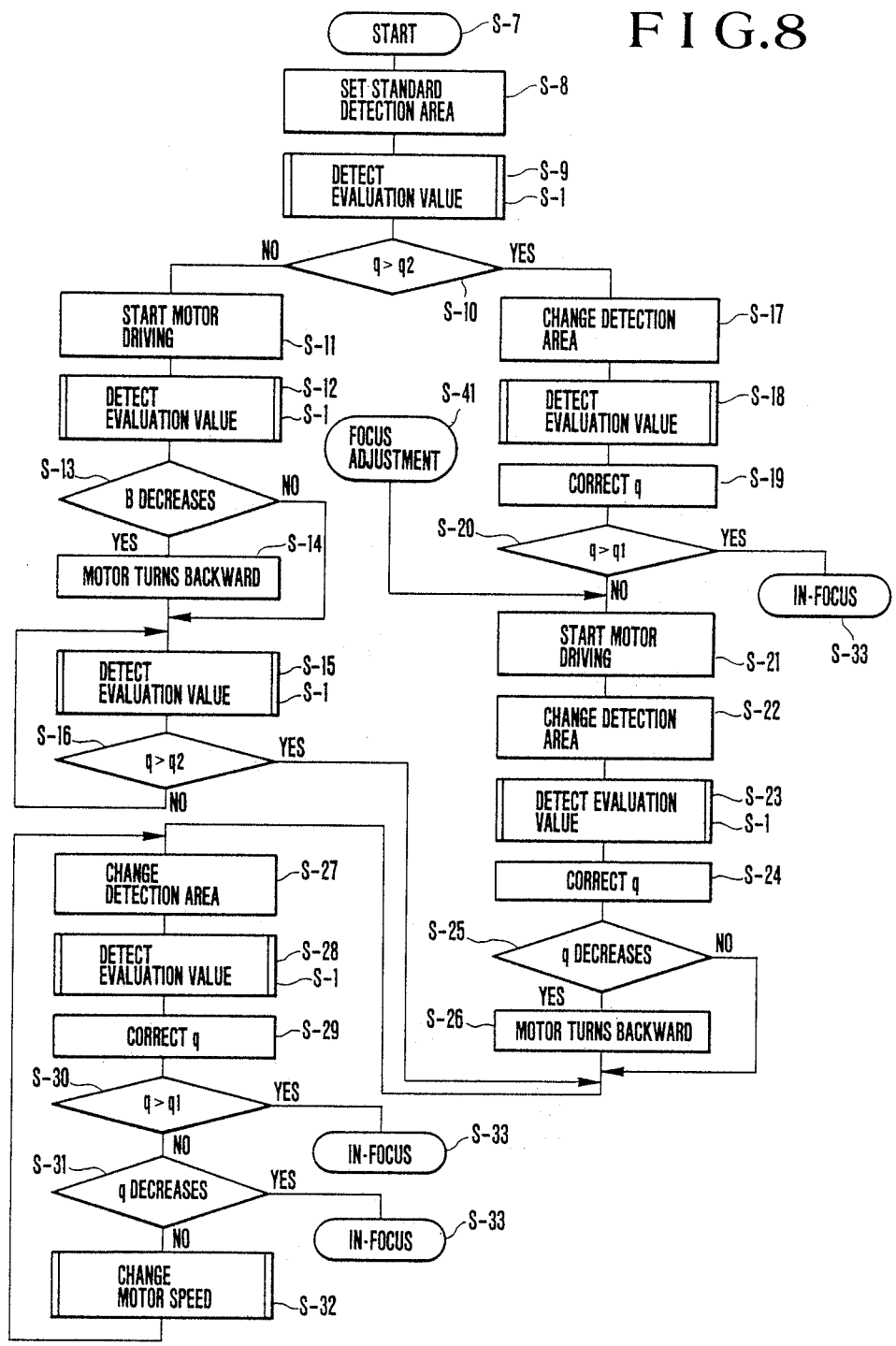
Figure 9:
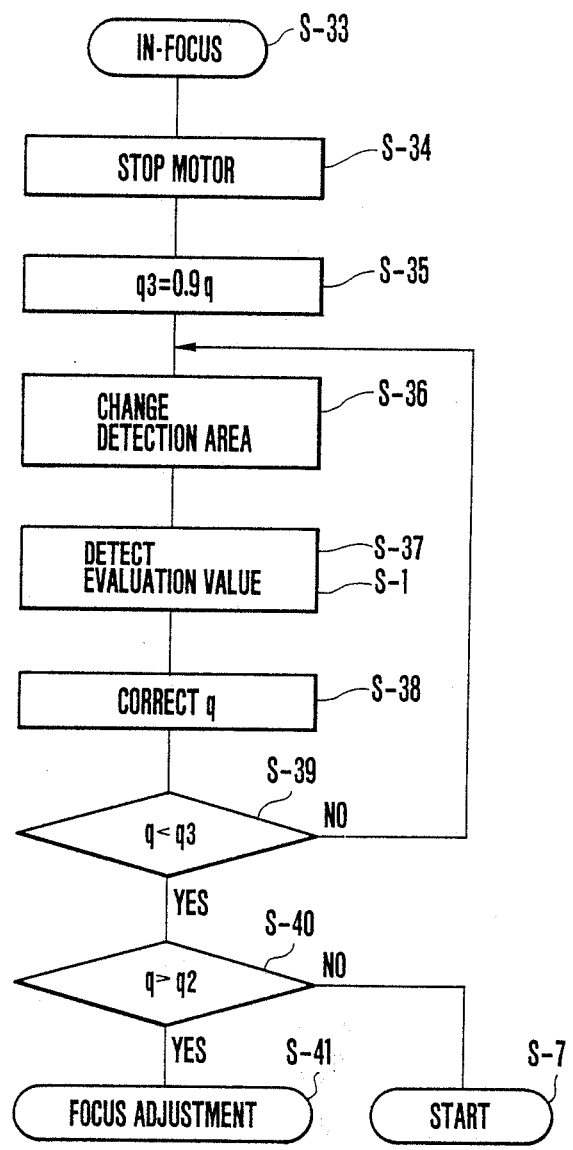

FIG. 7 is a flow chart showing a sub-routine having starting step S-1 and ending step S-6, for detecting an evaluation value q relative to the width of the edge part of an image and for taking in the intensity B of the high frequency component and the image movement vector V. FIG. 8 is a flow chart showing the flow of operation of the automatic focusing device arranged as the embodiment described. FIG. 9 is another flow chart showing the operation of the automatic focusing device to be performed when an in-focus state is detected.

Referring first to FIG. 7, the sub-routine is arranged as follows. At a step S-2, a control signal G is supplied to the gate circuit 17 at the beginning of each frame for the purpose of extracting an image signal obtained within the preset detecting area. At a next step S-3, from values P1, --- Pn which are stored at the memory 24 at the end of the frame, the intensity B of the high frequency component produced from the A/D converter 21 and the image movement vector V produced from the speed detecting circuit 29 are obtained. At steps S-4 and S-5, the evaluation values q indicating the sharpness degree or acuteness of the edge part are computed.

At these steps S-3 to S-5, the micro processor 30 operates as follows: First, the contents P1, P2, Pn of the memory 24 are read out one after another. The intensity value B of the high frequency component is obtained from the A/D converter 21 and the image movement vector V from the speed detecting circuit 29. The "n" indicated above represents the number of scanning lines included in the detecting area. A computing operation of a formula $$qi = \left( \sum_{k=i-M}^{i+M} Pk \right) / M$$

is performed (at the step S-4) on each of these values P1, P2, --- Pn for i=M+1~n−M, wherein "M" is an integer smaller than n; "Pk" the maximum value of the detected acuteness P(t) of the edge detected by the k-th scanning line; and "qi" an average maximum value of the acuteness values P(t) obtained by a consecutive number M of scanning lines. Accordingly, the acuteness degree of the most acute edge part having a certain length in the vertical direction of the image plane as shown in FIG. 1(a) is computed as q (step S-5). This value q is used as a scale for detecting the focused state of the optical system. In other words, in accordance with the arrangement, the width of the edge part having the maximum value of acuteness, that is, the narrowest edge width obtained at the step S-4 is detected for focus detection. Further, in the case of the ordinary video camera, the number n of the scanning line of the detecting area is preferably between 50 and 100 and the number M of averaging scanning lines between 5 and 10 or thereabout.

Referring to FIG. 8, the automatic focusing device operates as follows: The operation of the automatic focusing device begins at a step S-7. At a step S-8, a standard value of a detecting area (normally the middle part of an image plane) is set. In other words, a range within which the gate circuit 17 is to be operated under the control signal G at the step S-2 of FIG. 7 is set. Then, an evaluation value q is computed at a step S-9 in accordance with the flow chart of FIG. 7. At a step S-10, the evaluation value q thus obtained is compared with a noise level q2. In the case of q<q2, that is, if the evaluation value q is smaller than a predetermined value thus indicating that, because of a blurred state of the image, the edge width is large even in the narrowest edge width part of the object image, the optical system is driven at steps S-11 to S-16 in the direction of increasing the intensity B of the high frequency component until there obtains a relation of q>q2. The value q rapidly decreases according as the optical system deviates from an in-focus state to such a greater degree than, under an excessively blurred condition, detecting operation becomes impossible because of the noise. To solve this problem, the embodiment is provided with the circuit elements 18 to 21 as shown in FIG. 6. When the value q is lower than the given noise level value q2, the intensity value B of the high frequency component of the image signal is taken in and control is performed on the basis of the intensity value B in accordance with the hill climbing method. More specifically, at a step S-11, the motor is driven in a desired direction. Then, at a step S-13, the value B newly obtained is compared with the previous value B. If the result of comparison shows a decrease in the value B, the motor is caused to turn backward at a step S-14. At steps S-15 and S-16, the motor is continuously driven until the detected value q comes to exceed the value q2. When the position of the optical system comes nearer to an in-focus position to a certain degree and thus there obtains a relation q>q2, i.e. when the width of the narrowest edge part becomes narrower than a given width, the operation proceeds to a step S-27.

In the event of q>q2 at the step S-10, i.e. if the width of the narrowest edge part of the object image is narrower than a given value, the hill climbing control mentioned at the description of steps S-11 to S-16 is not performed and control is performed at steps S-17 to S-26 in such a way as to make the evaluation value q larger. First, if the detected movement vector V is greater than a predetermined value, the micro processor 30 gives at the step S-17 the control signal G to the gate circuit 17 to shift the detecting area as much as the movement vector V following the movement of the object. Then, at the step S-18, the flow of operation shown in FIG. 7 is carried out. The evaluation value q and the movement vector V are detected. Next, at the step S-19, the evaluation value q is corrected according to the movement vector V. More specifically, with the object image assumed to be moving at a velocity VH in the horizontal direction, the detected edge width increases by about a value VHΔt, in which Δt represents the accumulating time of the image sensor 1. Therefore, the computed value q is corrected according to this increment and is changed into a new value q.

At a step S-20, the operation shifts to a step S-33 with the photo-taking lens (or the optical system) is assumed to be in focus if there obtains a relation of q>q1. In the event of q<q1, a motor which shifts the focusing position of the photo-taking lens is first driven in an arbitrary direction at a step S-21. Then, at steps S-22 to S-26, the motor is driven in a direction in which the detected value q is increasing. Further, the steps S-22 to S-24 are similar to the steps S-17 to S-19.

At steps S-27 to S-32, an in-focus state is detected and the driving operation on the optical system is brought to a stop. More specifically, the value q is detected at steps S-27 to S-29. If the relation of q>q1 is detected or if a maximum value is detected before the value q reaches the value q1, the operation shifts to a step S-33 and, with an in-focus state assumed to have been attained, a process ensuing attainment of an in-focus state is carried out. Further, in this instance, the motor is rotating in the direction designated at the steps S-21 to S-26. In the event that the in-focus state is not detected, the motor is caused to rotate at a slower speed accordingly as the value q comes nearer to the value q1 at the step S-32 in accordance with a difference found between the values q and q1. Then, a check is made again to find the value q. The steps S-27 to S-32 are repeated until the lens is determined to be in focus.

In case that an in-focus state is detected at the step S-31 and the operation is shifted to the step S-33, this meas that an object having almost no edge part is selected as the object to be photographed. In accordance with the arrangement of this embodiment, therefore, the in-focus state of such an object that has almost no edge part also can be detected.

With the optical system thus having been brought into an in-focus state through the steps described, the micro processor 30 begins to monitor to see if the object moves in the direction of the optical axis of the lens or if a panning operation has come to necessitate focusing again on the object. FIG. 9 shows the flow of such a monitoring operation. When an in-focus state obtains, the motor driving operation is immediately brought to a stop at a step S-34. Following this, the micro processor 30 sets at a step S-35 another threshold value q3, for example at q3=0.9 q' which is somewhat smaller than a value q' which is the value q obtained when the in-focus state is attained. Then, if the object image is moving after this, the detecting area is changed at a step S-36.

At a step S-37, an evaluation value is detected in the manner as shown in FIG. 7. At a step S-38, the value q is corrected according to the movement of the image. At a step S-39, if there obtains a relation of q<q3, an automatic focusing operation is again performed. However, at a step S-40, if there obtains a relation of q>q2, this indicates no excessively blurred state. Therefore, at a step S-41, the focus of the lens is adjusted. In other words, the operation proceeds to a step S-41 shown in FIG. 8. However, in the event of q<q2 indicating an excessive blurred state, the operation comes back to the step S-7 to start the focusing operation over again. In case that the motor rotation is brought to a stop with the value q reaching its maximum value before reaching the threshold value q1, when, under that condition, a normal image of an object having some edge part next enters the detecting area, the image would be determined to be in focus even if it is blurred to some degree. To solve this problem, therefore, the motor is forcedly driven back and forth, for example, at intervals of one sec. and a check is thus made to see if the value q is actually at its maximum value. Further, under an in-focus condition, a fast moving object image might transverse the detecting area or panning might be suddenly performed. In that event, the value q might temporarily drops below the threshold value q3 to prompt a motor driving operation to be unnecessarily performed for readjustment of focus. To avoid such inconvenience, the arrangement of the embodiment may be modified to add some waiting time of, say, 0.5 second or thereabout when the value q comes to vary to an extent exceeding a given value; and the motor is allowed to be driven only when the value q is not recovered by the end of the waiting time.

The embodiment is thus arranged to be capable of making a discrimination between in-focus and out-of-focus states of the optical system without being affected by a difference in the kind or contrast of the object as it is arranged to simply detect the width of the edge part of an object image such as the contour thereof which appears in common among most of different objects. The embodiment described is, therefore, highly suitable for application to the automatic focusing device of such an apparatus as a video camera.

When the object moves, for example, forward or backward after the optical system is brought to a stop in a position of having a maximum degree of sharpness, the sharpness is dulled to have a blurred image. In that event, according to the method of the embodiment described in the foregoing, it is impossible to judge or discriminate an apposite focusing direction, or the direction in which the object has moved. Therefore, the optical system must be once moved in a random direction in search of the apposite focusing direction. This means a 50% probability of a lens shifting operation in a wrong direction. This, therefore, not only lowers the focusing responsivity in pursuit of the moving object but also results in a disagreeable picture in the case of an apparatus arranged to continuously take the picture of an object, such as a video camera or a TV camera.

To solve the above-stated problem, an automatic focusing device embodying this invention as a further embodiment thereof is arranged to be capable of discriminating the apposite focusing direction without driving the optical system when the object moves backward or forward after an in-focus state has been detected, so that a focusing operation can be promptly carried out.

The operating principle of the embodiment is as described below with reference to FIGS. 10(a), 10(b), 10(c), 11(a), 11(b) and 11(c).

FIGS. 10(a) and 11(a) show a depth of focus determined by the photo-taking optical system. The depth of focus represents a range within which the object image can be considered in focus on the image pick-up plane. In each of these drawings, the axis of ordinate shows the sharpness of the object image. As shown, the degree of sharpness increases according as the image comes to be better focused and reaches a maximum value where the image is best focused.

In focusing, as shown in FIG. 10(a), the phototaking lens is first shifted in the better focusing direction, i.e. in the direction of increasing the degree of image sharpness. The lens is then brought to a stop at a point beyond its position in which the maximum degree of sharpness is obtainable within the depth of focus. With the lens thus arranged to be brought to a stop in a position different from the maximum sharpness obtainable position, the degree of sharpness which is obtained when the lens is brought to a stop is stored. Following this, as shown with a broken line in FIG. 10(b), if the object moves in the direction of increasing a detected degree of sharpness, the apposite focusing direction can be determined to be opposite to the direction of the position at which the maximum degree of sharpness is obtained. Further, as shown with a broken line in FIG. 10(c), when the object moves in the direction of decreasing the detected degree of sharpness, the apposite focusing direction can be determined to be in the direction toward the position at which the maximum degree of sharpness is obtained.

Further, referring to FIG. 11(a), the apposite focusing direction is likewise determinable with the lens arranged to be brought to a stop at a point not exceeding the maximum sharpness obtainable position in cases where the object moves as shown with a broken line in FIG. 11(b) or 11(c).

The methods of bringing the photo-taking lens to a stop at a point different from the maximum sharpness obtainable position as shown in FIG. 10(a) or 11(a) include the following different methods.

In a first method, the maximum sharpness obtainable position is detected by driving the lens to shift its position in the direction of increasing the degree of image sharpness as shown in FIG. 10(a); and then the lens is further driven away from the detected position as much as an extent corresponding to a depth of focus computed from the focal length and the F-number of the photo-taking lens before the lens is brought to a stop.

In a second method, the photo-taking lens is driven to shift its position in the direction of increasing the image sharpness as shown in FIG. 11(a); then, a maximum sharpness obtainable position is predicted from a changing trend of sharpness found during the driving process; and, according to this prediction, the lens is brought to a stop within the depth of focus before the predicted position is reached. This prediction may be made according to a method disclosed, for example, in Japanese Patent Application No. SHO 61-46869.

A third method is a method of evaluating the sharpness of an object image independently of the luminance, contrast, the pattern or like characteristics of the object. The preceding embodiment described in the foregoing represents a specific example of such a sharpness evaluating method. The width of the edge part of the object image is detected and the degree of blurred state of the image can be evaluated independently of the contrast of the object. In a simplified version of this method, the high frequency component of the image signal is normalized by means of a low frequency component. Another simplified version is arranged as disclosed in Japanese Laid-Open Patent Application No. SHO 61-7443.

In the case of this sharpness evaluating method, the detected sharpness directly represents the blurred degree of the object image. Therefore, with the photo-taking lens driven in the direction of increasing the sharpness and with the driving operation brought to a stop at a point where the degree of sharpness comes to exceed a given threshold value, the lens can be brought to a stop at a point before the maximum sharpness obtainable position within the range of the depth of focus as shown in FIG. 11(a).

An embodiment operating on the above-stated principle is arranged as described below.

While this invention is applicable to all the sharpness evaluating methods mentioned in the foregoing, the sharpness evaluating method which is employed in the devices shown in FIGS. 4, 5 and 6 is also employed in this embodiment. FIG. 12 shows in a graph the operation of the embodiment. The axis of abscissa shows the position of the lens and the axis of ordinate shows the degree of sharpness q mentioned in the foregoing. As mentioned in the foregoing, the sharpness degree q is preferably independent of the luminance and contrast of the object as much as possible. A reference symbol qL2 denotes a threshold value between in-focus and out-of-focus states and a symbol qL1 is a value exceeding the threshold value qL2. In this embodiment, after an in-focus state is obtained, the photo-taking lens is brought to a stop at a point which is within the depth of focus and at which the sharpness degree q is between qL1 and qL2 and is not at its maximum value. Another symbol q3 denotes the noise level of the sharpness degree q.

Figure 13:
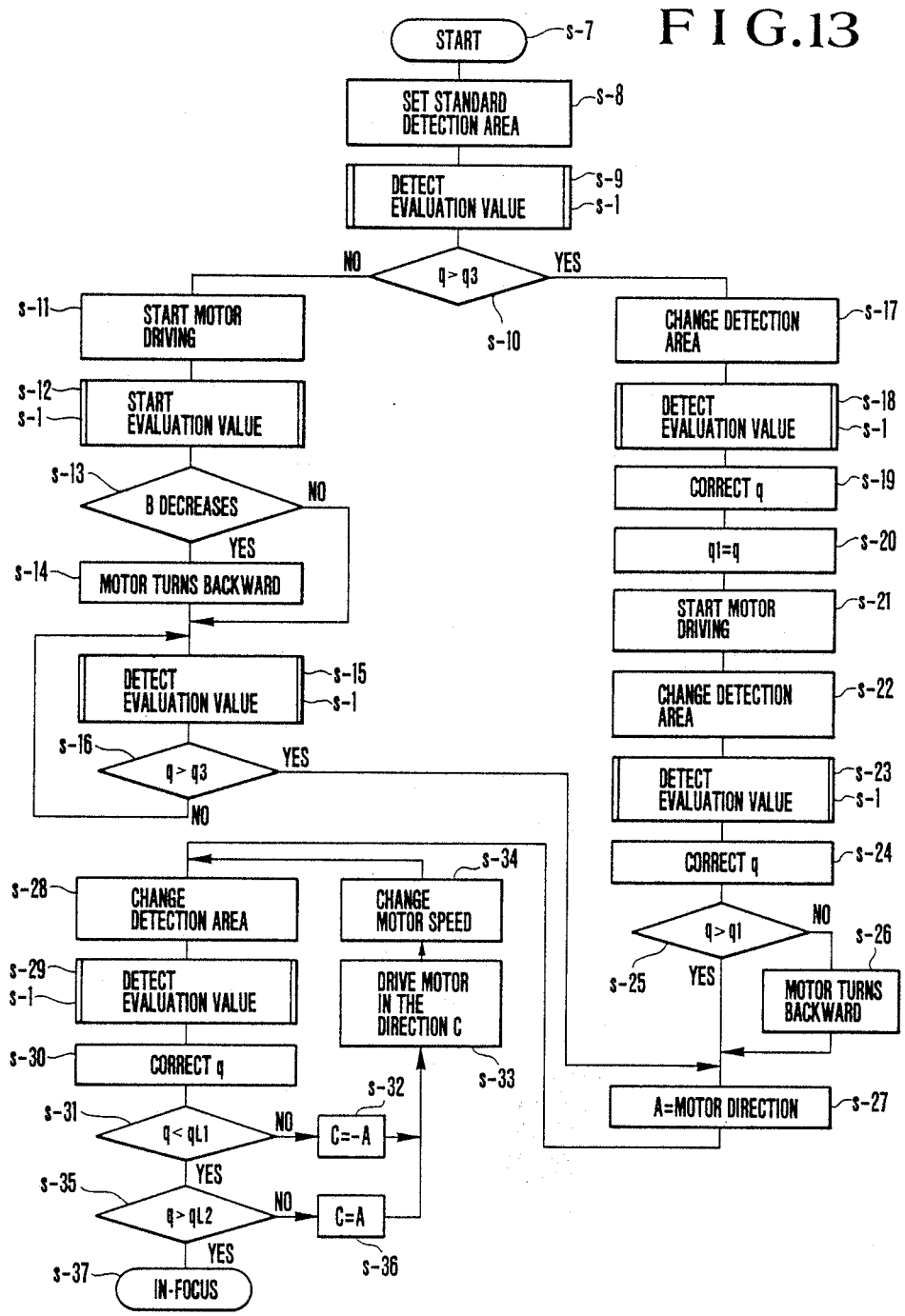
FIGS. 13 and 14 are flow charts showing the operation of the micro processor 30.

FIG. 13 is a flow chart showing the flow of operation of the automatic focusing device arranged as this embodiment. The arrangement of the device is identical with the arrangement shown in FIGS. 4, 5 and 6. The flow of operation in the case of this embodiment is as follows. Referring to FIG. 13, the automatic focusing device begins to operate at a step s-7. A standard detecting area is first set at a step s-8 (normally in the middle part of the image pick-up plane). More specifically, a range within which the gate circuit 17 is allowed to operate according to the control signal G is set as mentioned at the step S-2 of FIG. 7. At a step s-9, the value of the sharpness degree q is computed according to the flow of operation shown in FIG. 7. At a step s-10, the computed value q is compared with the noise level q3. If the result of comparison $q < q3$, that is, if the evaluated value q is smaller than the given value q3 thus indicating that even the narrowest edge width part of the object image is still excessively wide due to a blurred state of the image, the optical system is driven at steps s-11 to s-16 in the direction of increasing the intensity B of the high frequency component until there obtains a relation of $q > q3$, thus, since the value of the sharpness degree q rapidly decreases as the optical system deviates further from the in-focus position thereof, the presence of a noise makes focus detection impossible if the image is excessively blurred. Accordingly, at steps s-15 and s-16, the motor driving operation is continuously performed in the same manner as described in the foregoing until the detected value or evaluated value q comes to exceed the given value q3. When there obtains the relation of $q > q3$ with the position of the optical system having come closer to the in-focus position to some degree, i.e. when the width of the edge part of the image becomes narrower than a given width, the operation shifts to a step s-27.

Meanwhile, if the result of comparison made at the step s-10 is $q > q3$ indicating that the narrowest edge width of the object image is smaller than the given value, the hill climbing control shown at the steps s-11 to s-16 is not performed and control is performed at steps s-17 to s-26 in such a way as to increase the sharpness degree q. First, in case that a movement vector V exceeding a given value is detected, the micro processor 30 gives the control signal G to the gate circuit 17 in such a way as to shift the detecting area as much as the movement vector V following the movement of the object at the step s-17 in the same manner as stated in the foregoing with reference to FIG. 8. Following that, at the step s-18, the flow of operation shown in FIG. 7 is performed to detect the sharpness degree q and the movement vector V. At the next step s-19, the sharpness degree q is corrected according to the movement vector V. In other words, when the image moves at a speed VH in the horizontal direction, the detected edge width increases by about VHΔt, in which Δt represents the accumulating time of the image sensor 1. Therefore, the computed value q is corrected to a degree corresponding to this increment value and is changed into a new value q. At a step s-20, the value q is changed into q1.

Next, the motor which is arranged to shift the focusing position of the photo-taking lens is driven in a random direction at a step S-21. At steps S-22 to s-26, the motor is driven in the direction of increasing the detected value of sharpness degree q. The steps s-22 to s-24 are similar to the steps s-17 to s-19.

At a step s-27, the motor driving direction to be taken at that point of time is stored at A. The A is arranged to be "1" when the optical system is being shifted from an infinity distance position toward a nearest distance position and to be "-1" when the optical system is shifting in the opposite direction.

At steps s-28 to s-36, an in-focus state is detected and the driving operation on the optical system is brought to a stop. Of these steps, at the steps s-28 to s-30, the value of the sharpness degree q is detected. At the step s-31, a check is made to see if the value q is larger than the threshold value qL1 shown in FIG. 12. If it is found to be larger, the operation proceeds to the step s-32. If not, the operation branches out to steps s-35. At the step s-35, a check is made to find whether the detected value q is larger than the threshold value qL2 shown in FIG. 12. If so, the flow of operation comes to a step s-37. If not, it branches to a step s-36. Therefore, the in-focus state is considered attained at the step s-37 if the sharpness degree q is smaller than the value qL1 and larger than the value qL2. Further, if the sharpness degree q is larger than the value qL1, the motor driving direction C is set in the direction reverse to the driving direction A set through the flow of operation described above. In case that the sharpness value q is smaller than the value qL2, the motor driving direction C is changed at the step s-36 to be the same as the above-stated driving direction A. At the step s-33, the motor is driven in the direction of C. The motor speed is changed to become slower as the value q becomes closer to the value qL1 or qL2. Then, the value of the sharpness degree q is again detected. The steps s-28 to s-36 are repeated until the optical system is determined to have reached an in-focus state.

Figure 14:
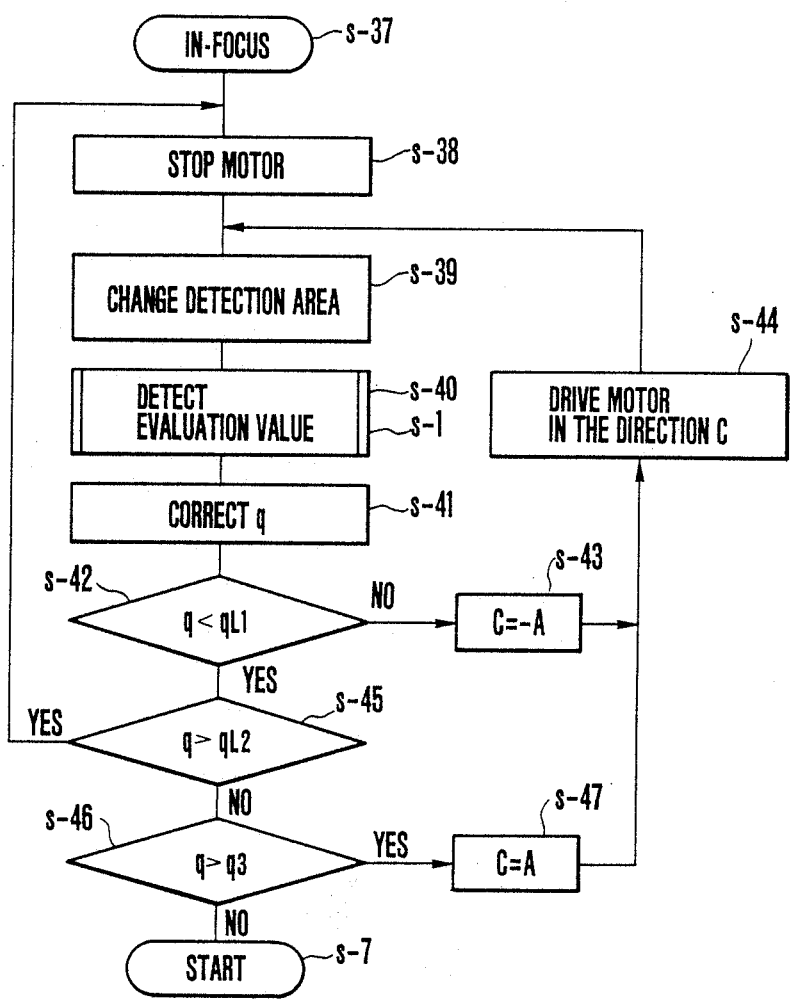

After the optical system is brought into the in-focus state by the above-stated steps, the ensuing automatic focusing operation is performed as described below with reference to the flow chart of FIG. 14.

With the in-focus state having been attained, the motor driving operation is immediately brought to a stop at a step s-38. At a step s-39, if the image is moving, the detecting area is changed accordingly at a step s-39. At a step s-40, the sharpness degree q is detected in the same manner as shown in FIG. 7. At a step s-41, the value q is corrected according to the movement of the image. If the image is not moving, the detecting area is not changed. Under a condition in which the sharpness degree q is smaller than the value qL1 and larger than the value qL2, steps s-38 to s-45 are repeated while the motor remains stationary.

Under this condition, when the sharpness degree q becomes larger than the value qL1 with a distance between the object image and the position of the image pick-up optical system having changed, the flow of operation branches out from the step s-43 to the step s-44. Then, at the step s-43, the motor driving direction C is taken in the direction opposite to the above-stated motor driving direction A. At the step s-44, the motor is driven to shift the position of the optical system in a defocusing direction which is reverse to the focusing direction. Further, in case that the sharpness degree q becomes smaller than the value qL2, the flow of operation branches from the step s-45 to a step s-46. At the step s-46, if the sharpness degree q is found to be larger than the value q3 mentioned in the foregoing, the flow of operation branches out to a step s-47. Then, the motor driving direction C is changed to the same direction as the above-stated motor driving direction A. At the step s-44, the motor is driven to shift the image pick-up optical system in the focusing direction. In case that the sharpness degree q is found to be smaller than the value q3 at the step s-46, this indicates either an excessively blurred state of the image or displacement of the object. In that event, therefore, the operation comes back to the start step s-7 to perform the focusing operation over again.

Therefore, this embodiment is capable of always reliably performing a focusing operation on the object to be photographed even if the object is such an object as shown in FIG. 3(a). In accordance with the arrangement of this embodiment, the focusing direction can be discriminated without driving the optical system when the optical system comes to a stop after the object image comes in focus on the image pick-up plane. Therefore, the embodiment enables such system as a video or TV camera that is arranged to continuously take the picture of an object by following the back and forth movement of the object. The embodiment is therefore highly suitable for applications to the automatic focusing devices of video cameras or the like.

As described in the foregoing, this embodiment is arranged to determine the optical system driving direction by allowing the position of the optical system to shift from a maximum sharpness attainable position in a predetermined direction within a focusable range and then by using information on the direction and the degree of sharpness obtained. Compared with the conventional arrangement of driving the image pick-up optical system in a random direction in bringing it into a maximum sharpness attainable position, the arrangement of this embodiment is capable of immediately determining the optical system driving direction.

What is claimed is:

1. A focus detecting apparatus responsive to incident radiation corresponding to an image, comprising:
    (a) converting means for converting said incident radiation into an electrical signal to produce a time series image signal as an output;
    (b) detecting means for receiving said image signal and for detecting the width of an edge of said image from said image signal and for generating an output signal indicative of such detected width; and
    (c) discrimination means for receiving said detecting means output signal and for discriminating the focus condition of said radiation from said detecting means output signal.

2. The apparatus of claim 1, wherein said converting means includes:
    (a) image pick up means for converting said incident radiation into said image signal; and
    (b) conducting means for conducting said radiation to said image pick up means.

3. The apparatus of claim 2, wherein said image pick up means is of two dimensional type.

4. The apparatus of claim 3, wherein said detecting means detects the width of the edge of said image in a predetermined direction.

5. The apparatus of claim 2, wherein said discriminating means includes means for comparing said edge width detected by said detecting means with a predetermined edge width value.

6. The apparatus of claim 5, wherein said predetermined edge width value corresponds to the minimum diameter of the circle of confusion of said conducting means.

7. The apparatus of claim 1, wherein said detecting means includes:
    (a) first detecting means for detecting the difference between the highest and lowest degrees of luminance obtained at such edge of said image and for generating an output indicative thereof;
    (b) second detecting means for detecting the luminance gradient at said edge of said image and for generating an output indicative thereof; and
    (c) computing means for receiving such outputs of said first and second detecting means and for computing the width of said edge part of said image therefrom.

8. The apparatus of claim 4, wherein said predetermined direction is a horizontal scanning direction with respect to said incident radiation.

9. The apparatus of claim 8 wherein said converter means effects repetitive such horizontal scanning, said apparatus further comprising holding means for holding the maximum value of the edge width of said image obtained by each such horizontal scanning.

10. The apparatus of claim 1, wherein said discriminating means discriminates said focus condition on the basis of a plurality of width values of a plurality of edges detected by said detecting means.

11. A focus detecting apparatus for detecting the focus condition of an image, comprising:
    (a) converting means for picking up an image and for generating an electrical signal having a time successive characteristic indicative of characteristics of said image;
    (b) detecting means for receiving said electrical signal and for detecting the width of each edge part of said image from said electrical signal and for counting edge parts that have an edge width less than a predetermined edge width value and for providing an output signal indicative of such count; and (c) discriminating means for receiving said detecting means output signal and for discriminating the focus condition of said image from said detecting means output signal.

12. The apparatus of claim 11, wherein said image has plural plane portions and wherein said detecting means performs said counting for one such image plane portion.

13. The apparatus of claim 11, wherein said converting means includes:
(a) image pick up means for converting said incident radiation into said electrical signal; and
(b) conducting means for conducting said image to said image pick up means.

14. The apparatus of claim 13, further comprising signal generating means for generating a signal indicative of characteristics of said conducting means.

15. The apparatus of claim 14, wherein said discriminating means is operable in plural discriminating modes and changes the operative discriminating mode thereof from one mode over to another in accordance with the signal generated by said signal generating means.

16. The apparatus of claim 15, wherein said discriminating means has a first operating mode for detecting said focus condition by comparing the count indicated in said detecting means output signal with a predetermined number.

17. The apparatus of claim 16, wherein said discriminating means changes the operative discriminating mode thereof by changing said predetermined number.

18. A focus detecting apparatus for detecting the focus condition of an image, comprising:
(a) a group of focus detecting means, inclusive of
(1) first detecting means for detecting the width of an edge of said image and for generating an output indicative thereof; and
(2) second detecting means for detecting a characteristic parameter of said image other than said width and for generating an output indicative thereof; and
(b) discriminating means for receiving said outputs of said first and second detecting means and for discriminating the focus condition of said image according to the output of one of said first or second detecting means.

19. The apparatus of claim 18, wherein said second detecting means detects a high frequency parameter of said image.

20. The apparatus of claim 19, wherein said discriminating means discriminates said focus condition according to the output of said second detecting means when the output of said first detecting means is indicative of a predetermined condition.

21. The apparatus of claim 19, wherein said discriminating means discriminates said focus condition according to the output of said second detecting means when the output of said first detecting means indicates that focus discrimination by use of said output cannot be attained.

22. A focus control apparatus for an optical device of the type responsive to image radiation incident thereon to issue output radiation and including means driveable for focusing, said apparatus comprising:

(a) converting means for converting said incident radiation into an electrical signal to produce a time series image signal as an output;
(b) detecting means for receiving said image signal and for detecting the width of an edge of said from said image signal and for generating an output signal indicative of such detected width; and
(c) drive means for driving said drivable means of said optical device in response to the output signal of said detecting means.

23. The apparatus of claim 22, wherein said drive means stops said drivable means when the edge width indicated in said detecting means output signal is less than a predetermined edge width value.

24. The apparatus of claim 22, further comprising discriminating means for receiving said detecting means output signal and for discriminating the focus condition of said output radiation from said detecting means output signal.

25. The apparatus of claim 22, wherein said optical device is an objective lens.

26. A focus control apparatus for an optical device of the type responsive to image radiation incident thereon to issue output radiation and including means driveable for focusing, said apparatus comprising:
(a) detecting means for receiving said output radiation and for detecting the sharpness thereof and for generating an output signal indicative of said sharpness; and
(b) drive means for driving said driveable means of said optical device
(1) to shift the position thereof in the direction of increasing said sharpness and
(2) to bring said driveable means of said optical device to a stop at a point which deviates in a predetermined direction from a maximum sharpness obtainable position of said driveable means.

27. The apparatus of claim 26, further comprising:
(c) means for determining the direction in which said driveable means of said optical device is to be driven by said drive means according to the sharpness indicated in said detecting means output signal and to said predetermined direction after said driveable means is brought to a stop by said drive means.

28. The apparatus of either claim 26 or 27, wherein said detecting means includes means for detecting a high frequency component of said image formed by said optical device.

29. The apparatus of either claim 26 or 27, wherein said detecting means includes edge width detecting means for detecting the width of the edge of said image formed by said optical device.

30. The apparatus of claim 26, wherein said drive means is arranged to bring said driveable means to a stop at a point beyond the maximum sharpness obtainable position thereof.

31. The apparatus of claim 26, wherein said drive means is arranged to bring said driveable means to a stop without allowing said driveable means to pass over the maximum sharpness obtainable position thereof.

32. A focus control apparatus for an optical device of the type responsive to image radiation incident thereon to issue output radiation and including means driveable for focusing, said apparatus comprising:
(a) detecting means for receiving said output radiation and for detecting the sharpness thereof and for generating an output signal indicative of said sharpness;
(b) drive means for driving said driveable means of said optical device
  (1) to shift the position thereof in the direction of increasing said sharpness and
  (2) to bring said driveable means of said optical device to a stop at a point deviating from a maximum sharpness obtainable position of said optical means;
(c) signal generating means for generating an output signal indicative of the deviating direction of said point at which said driveable means is brought to a stop by said drive means; and
(d) driving direction determining means for determining the direction in which said driveable means is to be driven, said direction being determined from said output signal generated by said signal generating means and the degree of sharpness indicated in said output signal of said detecting means.

33. The apparatus of claim 32, wherein said detecting means includes means for detecting a high frequency component of said image formed by said optical device.

34. The apparatus of claim 32, wherein said detecting means includes edge width detecting means for detecting the width of an edge of said image formed by said optical device.

35. A focus control apparatus for an optical device of the type responsive to image radiation incident thereon to issue output radiation and including means driveable for focusing, said apparatus comprising:
(a) converting means for converting said output radiation into an electrical signal to produce a time series image signal as an output;
(b) first detecting means for detecting an edge width of said output radiation from said image signal and for generating an output signal indicative thereof;
(c) second detecting means for detecting a characteristic parameter of said image other than said width and for generating an output signal indicative thereof;
(d) drive means for driving said driveable means of said optical device;
(e) first control means for controlling said drive means in response to one or both of said first and second detecting means output signals and for stopping said optical device in its focused state; and
(f) second control means for controlling said driving means by said first control means again when it has been detected by said first detecting means that the optical device has become unfocused, thereby returning said optical device to its focused state.

36. A focus control apparatus according to claim 35, in which said second detecting means detects the focused state on the basis of a peak level of a predetermined high frequency component in said image signal.

37. A focus control apparatus for an optical device of the type responsive to image radiation incident thereon to issue output radiation and including means driveable for focusing, said apparatus comprising:
(a) converting means for converting said output radiation into an electrical signal to produce a time series image signal as an output;
(b) first detecting means for detecting an edge width of said output radiation from the image signal output produced by said converting means and for generating an output signal indicative thereof;
(c) second detecting means for detecting a characteristic parameter of said image other than said edge width and for generating an output signal indicative thereof;
(d) drive means for driving said driveable means of said optical device; and
(e) control means for controlling said drive means in response to the output signal of said second detecting means to drive said optical device towards its focused state and for stopping said drive means when it is detected by said first detecting means that the optical device reaches its focused state, thereby stopping said optical device at its focused position.

38. A focus control apparatus according to claim 37, in which said second detecting means detects the focused state on the basis of a peak level of a predetermined high frequency component in said image signal.

39. The apparatus of claim 35, wherein said converting means includes;
(a) image pick up means for converting said incident radiation into said image signal; and
(b) means for conducting said radiation to said image pick up means.

40. The apparatus of claim 39, wherein said image pick up means is a two-dimensional image pick up means.

41. The apparatus of claim 40, wherein said first detecting means detects the width of the edge of said image in a predetermined direction.

42. The apparatus of claim 39, wherein said first detecting means includes means for comparing such detected width with a predetermined value.

43. The apparatus of claim 43, wherein said predetermined value corresponds to the minimum diameter of the circle of confusion of said conducting means.

44. The apparatus of claim 35, wherein first detecting means is operative to detect the difference between the highest and lowest degrees of luminance obtained at the edge of said image and wherein said second detecting means is operative to detect a luminance gradient obtained at said edge of said image, said apparatus further including computing means of computing the width of such image edge from said output signals of said first and second detecting means.

45. The apparatus of claim 41, wherein said predetermined direction is a horizontal scanning direction.

46. The apparatus of claim 45, further comprising holding means for holding the maximum value of the edge width of said image obtained by each such horizontal scanning.

47. The apparatus of claim 35, further including discriminating means for discriminating said focus condition on the basis of a plurality of width values of a plurality of edges detected by said first detecting means.

48. The apparatus of claim 37, wherein said converting means includes:
(a) image pick up means for converting said incident radiation into said image signal; and
(b) means for conducting said radiation to said image pick up means.

49. The apparatus of claim 48, wherein said image pick up means is a two-dimensional image pick up means.

50. The apparatus of claim 49, wherein said first detecting means is arranged to detect the width of the edge of said image in a predetermined direction.

51. The apparatus of claim 47, wherein said discriminating means includes means for comparing said width detected by said first detecting means with a predetermined value.

52. The apparatus of claim 51, wherein said predetermined value corresponds to the minimum diameter of the circle of confusion of said conducting means.

53. The apparatus of claim 37, wherein first detecting means is operative to detect the difference between the highest and lowest degrees of luminance obtained at the edge of said image and wherein said second detecting means is operative to detect a luminance gradient obtained at said edge of said image, said apparatus further including computing means for computing the width of such image edge from said output signals of said first and second detecting means.

54. The apparatus of claim 50, wherein said predetermined direction is a horizontal scanning direction.

55. The apparatus of claim 54, further comprising holding means for holding the maximum value of the edge width of said image obtained by each such horizontal scanning.

56. The apparatus of claim 37, wherein said discriminating means is arranged to discriminate said focus condition on the basis of a plurality of width values of a plurality of edges detected by said first detecting means.

* * * * *

UNITED STATES PATENT AND TRADEMARK OFFICE
CERTIFICATE OF CORRECTION

PATENT NO. : 4,804,831

DATED : February 14, 1989

INVENTOR(S) : Takashi Baba et al.

It is certified that error appears in the above-identified patent and that said Letters Patent is hereby corrected as shown below:

```
Col. 2, line 32, change "an" to -- a --.
Col. 2, line 47, change "in despite" to -- inspite --.
Col. 3, line 45, change "iamge" to -- image --.
Col. 3, line 52, delete "an".
Col. 3, line 56, delete "However,".
Col. 3, line 59, before "since", insert -- However, --.
Col. 4, line 1, change "iamge" to -- image --.
Col. 4, line 32, after "it", insert -- is --.
Col. 4, line 51, change "normalizig" to -- normalizing --.
Col. 4, line 66, delete "pressed" second occurrence.
Col. 5, lines 60-65, in the formula insert
```

-- $\int$ --.

Col. 6, line 50, in the formula insert -- $\int$ --.
Col. 8, line 3, change "of" to -- if --.
Col. 8, line 61, change "P2,PN" to -- P2, --- PN --.
Col. 9, line 45, change "than" to -- that --.
Col. 10, line 21, change "with" to -- and --.
Col. 10, line 50, change "meas" to -- means --.
Col. 13, line 59, change "q3, thus," to -- q3. Thus, --.

Signed and Sealed this

Eleventh Day of July, 1989

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,804,831

DATED : February 14, 1989

INVENTOR(S) : Takashi Baba et al.

It is certified that error appears in the above-identified patent and that said Letters Patent is hereby corrected as shown below:

```
Col. 14, line 48, change "steps" to -- step --.
Col. 20, line 20, claim 39, change ";" to -- : --.
Col. 20, line 34, claim 43, change "The apparatus of claim 43,"
     to -- The apparatus of claim 42, --.
Col. 20, line 43, claim 44, change "of" to -- for --. (1st occurr.)
```

Signed and Sealed this

Eleventh Day of July, 1989

Attest:

DONALD J. QUIGG

*Attesting Officer*   *Commissioner of Patents and Trademarks*